M. WALTER.
MOTOR VEHICLE.
APPLICATION FILED DEC. 20, 1913.
1,166,726.
Patented Jan. 4, 1916.
5 SHEETS—SHEET 5.
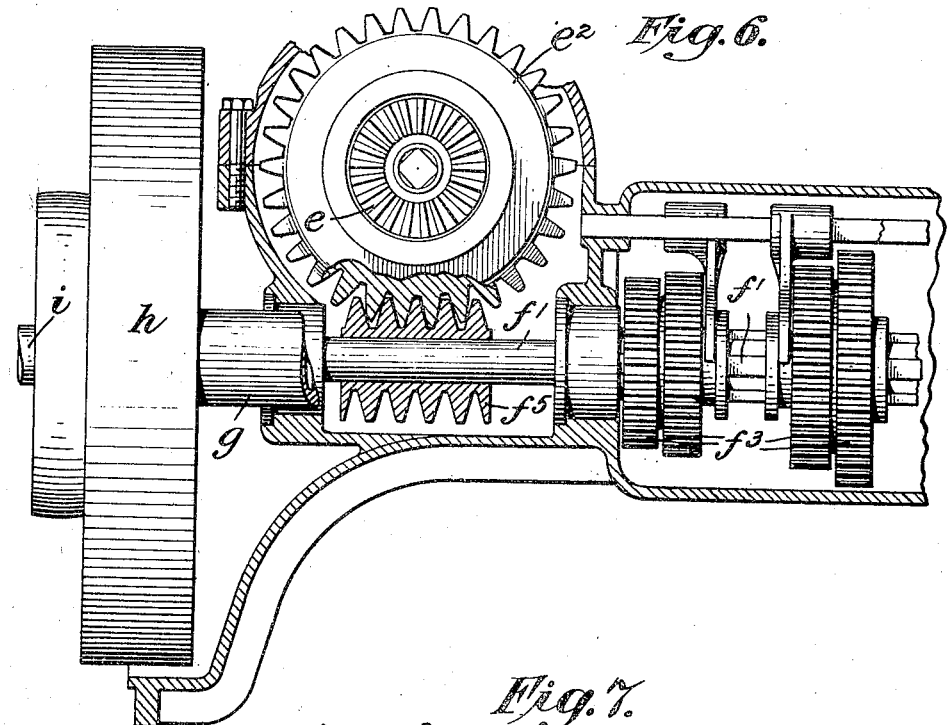
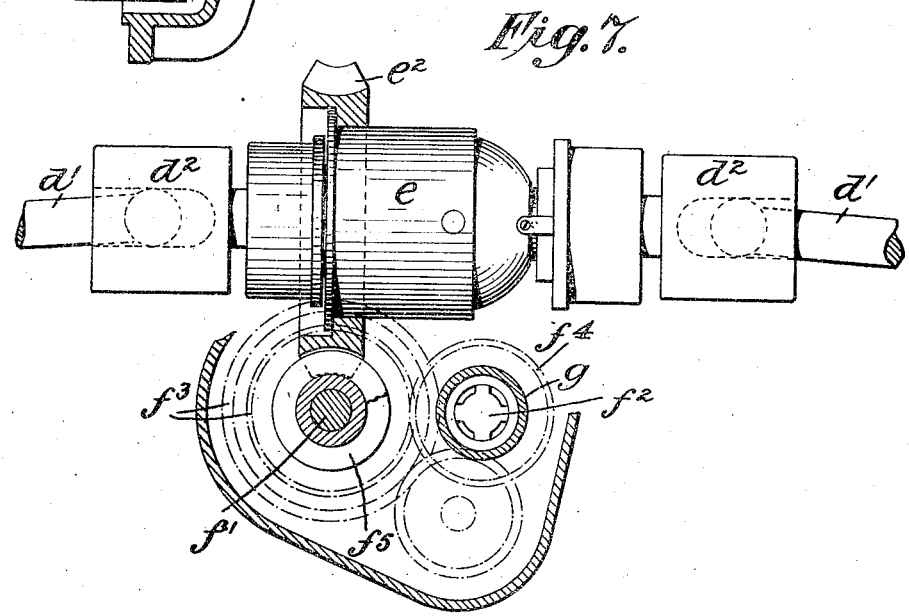

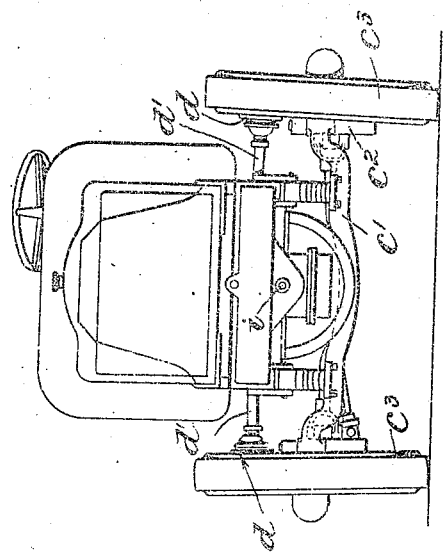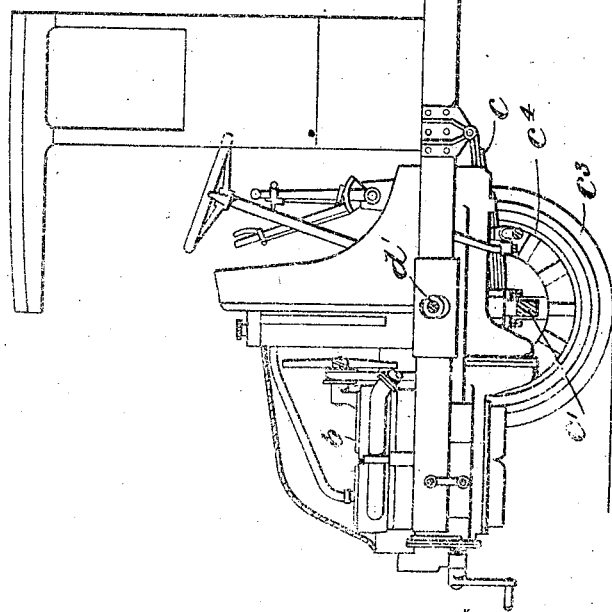

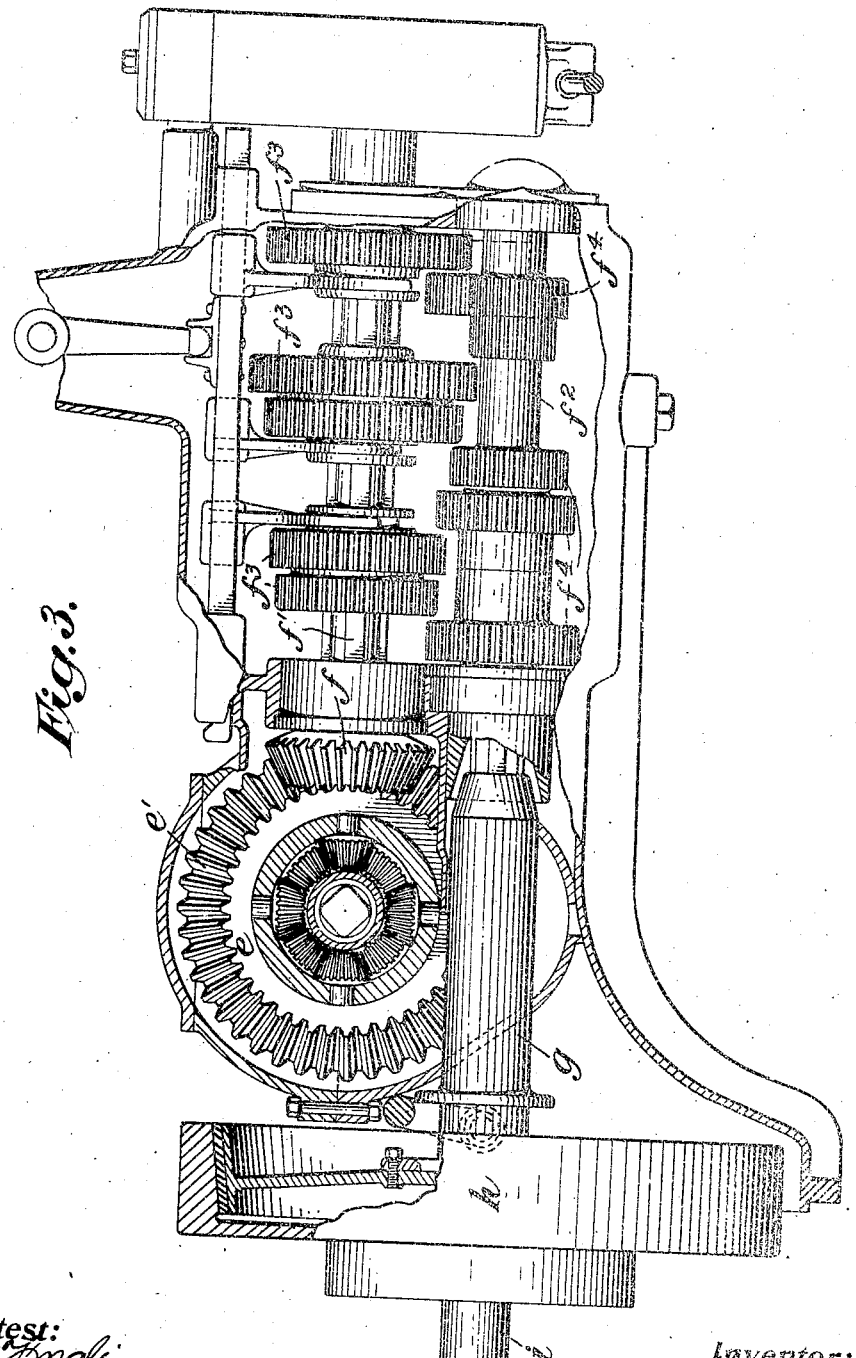

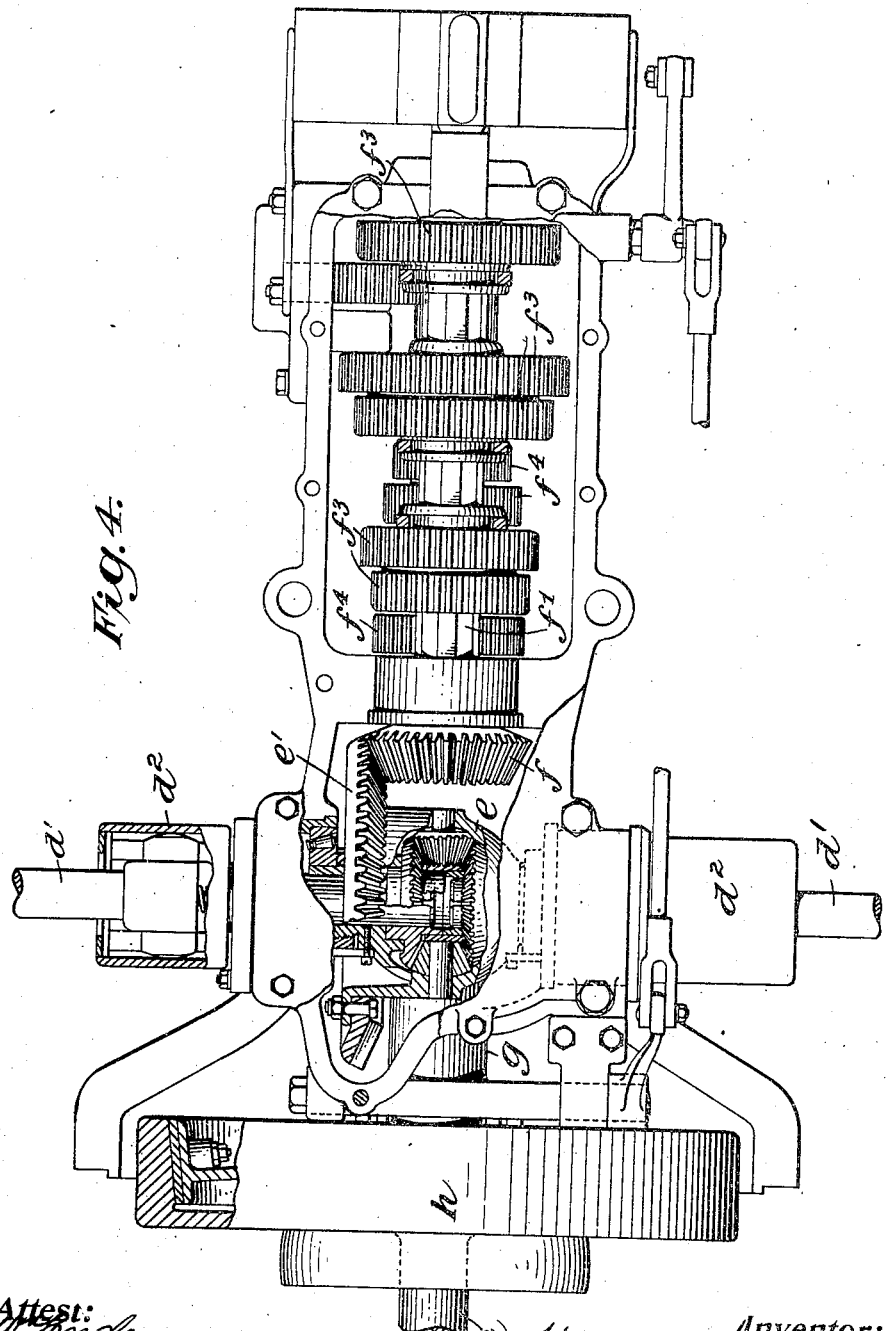

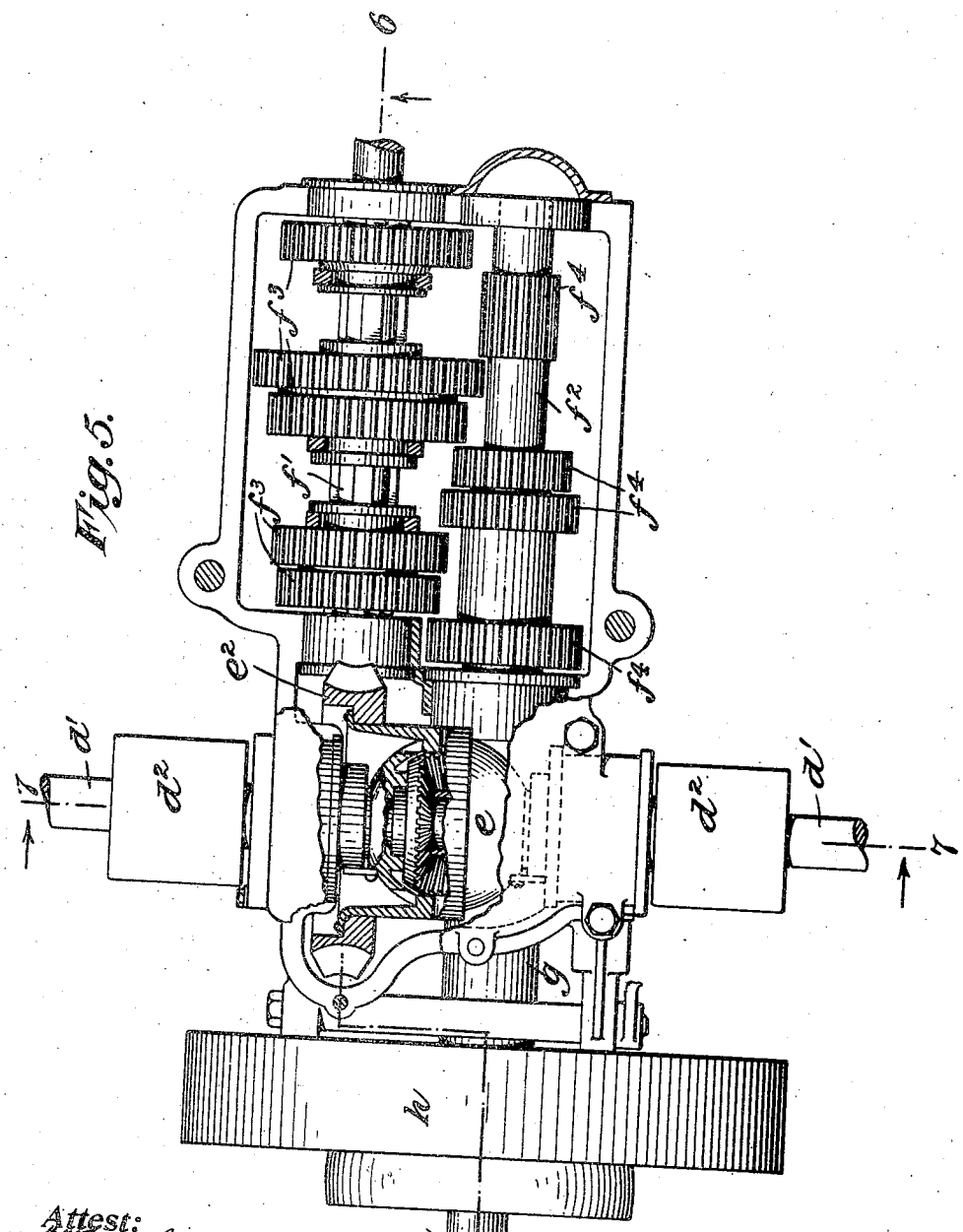

UNITED STATES PATENT OFFICE.

MAURICE WALTER, OF NEW YORK, N. Y.

MOTOR-VEHICLE.

1,166,726.  Specification of Letters Patent.  Patented Jan. 4, 1916.

Application filed December 20, 1913. Serial No. 807,855.

*To all whom it may concern:*

Be it known that I, MAURICE WALTER, a citizen of the United States, residing in the borough of Manhattan of the city of New York, in the county of New York, in the State of New York, have invented certain new and useful Improvements in Motor-Vehicles, of which the following is a specification, reference being had to the accompanying drawings, which form a part hereof.

This invention relates to motor vehicles in which the front wheels are both drive and steering wheels, and in which the driving power is transmitted to the drive wheels through two transverse Cardan shafts, usually mounted above the axle on which the wheels are supported. In motor vehicles of this description, as heretofore constructed, the Cardan shafts have been driven through universal joints from a differential gear, but the change-speed shaft of the transmission has been arranged at right angles to the longitudinal axis of the motor vehicle and usually in front of the front axle. This construction has required three sets of intermediate gears and has been somewhat cumbersome and difficult of access.

The object of the present invention is to improve the construction and arrangement of the parts with respect to the change-speed gear and its connections to the Cardan shafts and especially to require a smaller number of intermediate gears than in the old construction, to provide for the more compact arrangement of the parts with respect to the axis of the motor shaft and the front axle so that the Cardan shafts may be more nearly horizontal without requiring the motor shaft to be placed too low, and so that the motor may be close to the differential and therefore with a minimum of forward overhang and to make all parts of the mechanism more readily accessible.

In accordance with this invention the change-speed gear is placed with its axes parallel with the longitudinal axis of the motor vehicle and the differential gear is engaged, through suitable gears, directly with the second shaft of the change-speed gear and is placed above the front axle and directly behind the motor.

The invention will be more fully explained hereinafter with reference to the accompanying drawings in which it is illustrated and in which—

Figure 1 is a view in side elevation of a motor truck equipped with the invention, the near front wheel being removed and the axle and some other parts being shown in section. Fig. 2 is a view in end elevation of the same. Fig. 3 is a detail view partly in side elevation and partly in section showing the clutch, the change-speed gear and a portion of the differential gear, the scale of the figure being larger than that of Figs. 1 and 2. Fig. 4 is a top view of the parts shown in Fig. 3, also partly in section, and showing also parts of the two Cardan shafts. Fig. 5 is a view generally similar to Fig. 3 but illustrating a different form of operative connection between the second shaft of the change-speed gear and the differential. Fig. 6 is a partial view of the same partly in elevation and partly in section. Fig. 7 is a detail front view of the parts shown in Fig. 6 with the clutch removed.

The main frame $a$ of the truck shown in the drawings may be constructed in any suitable manner and may be provided as usual with a rear axle $a'$ suspended by springs $a^2$ and rear wheels $a^3$, one of which is shown in Fig. 1. At its forward end the frame supports a suitable motor $b$ and in rear of the motor is provided with usual springs $c$ which support in usual manner the front axle $c'$. On the latter are supported, by the usual steering knuckles $c^2$, the front wheels $c^3$ which are provided each with an inclosed gear as at $c^4$ adapted to be engaged by a driving pinion, indicated at $d$, on the end of the corresponding Cardan shaft $d'$. The Cardan shafts $d'$ are supported in the usual manner and at their inner ends are connected by suitable universal joints, indicated at $d^2$, with the members of a differential gear $e$ which may be of usual construction.

The middle or driving member of the differential gear, in the construction shown in Figs. 3 and 4, is provided with a bevel gear $e'$ which is engaged by a bevel pinion $f$ on the front end of the second shaft $f'$ of the change-speed gear. The change-speed gear may be constructed in any suitable manner, the second shaft $f'$ and the first shaft $f^2$ being shown as provided with the usual change-speed pinions $f^3$ and $f^4$. The shaft $f^2$ is mounted axially in line with the motor shaft $i$ to which it is operatively coupled through the short shaft section $g$ and the usual friction clutch $h$ the axes of the shafts of the change-speed gear being therefore parallel with the longitudinal axis of the motor vehicle with the axis of the first shaft above the front axle $c'$ and below the axis of the differential gear $e$. This arrangement, as will be observed, not only requires only one set of intermediate gears between the change-speed gear and the differential gear, that is, the bevel pinion $f$ and the bevel gear $e'$, but it permits the Cardan shafts to be very nearly horizontal, as is highly desirable in the transmission of power through them, while at the same time they are free to move as required by the movements of the front driving wheels with respect to the motor shaft. It also permits the placing of the differential directly behind the motor thereby shortening the distance from the motor to the Cardan shafts and consequently to the front axle.

In the construction shown in Figs. 5, 6 and 7 the first shaft $f^2$ of the change-speed gear is similarly arranged in line with the motor shaft $i$ from which it is driven through the clutch $h$ and the short shaft section $g$ as before. The second shaft $f'$ of the change-speed gear may also be driven as before from the first shaft $f^2$ through the change-speed pinions $f^3$ and $f^4$. In this instance, however, the second shaft $f'$, with its axis above, or as shown, below the axis of the differential gear, is provided on the front end with a worm $f^5$ which meshes with a worm gear $e^2$ on the middle or driving member of the differential gear $e$, to which the Cardan shafts $d'$ are operatively connected through universal joints indicated at $d^2$.

It will be observed that when the gear shafts are placed generally in the longitudinal plane of the motor vehicle, whether exactly horizontal and with the first shaft in line with the motor shaft as shown in Figs. 2 and 3, or not, and whether the second shaft is in the same plane with the axis of the differential gear as shown in Figs. 2 and 3, or out of that plane, as shown in Figs. 6 and 7, the general arrangement of the change-speed gear with its axes transverse to the axis of the differential gear and behind it, permits a very compact arrangement of the parts and the Cardan shafts to be placed substantially horizontal without requiring the axis of the motor shaft to be placed too low and shortens the overhang of the motor. It will also be observed that the improved construction permits the differential gear and the change-speed gear with their connections to the Cardan shaft and to the clutch to be assembled as a unitary transmission mechanism, in a common casing which may be readily secured to the motor casing and that when such casing is opened all of the parts of the transmission mechanism are readily accessible.

I claim as my invention:—

1. In a motor vehicle, the combination with a motor, front drive and steering wheels, Cardan shafts for the wheels, a differential gear between the Cardan shafts, and universal couplings between the differential gear and the Cardan shafts, of a change-speed gear directly behind the differential gear with its axes longitudinally disposed and its first shaft in line with the motor shaft and operatively connected therewith, and a single set of intermediate gears between the second shaft of the change-speed gear and the differential gear.

2. In a motor vehicle, the combination with a motor, front drive and steering wheels, Cardan shafts for the wheels, a differential gear between the Cardan shafts, and universal couplings between the differential gear and the Cardan shafts, of a change-speed gear directly behind the differential gear with its axes longitudinally disposed, a driving connection between the motor and the first shaft of the change-speed gear, a bevel gear on the differential gear, and a bevel pinion on the second shaft of the change-speed gear and in mesh with said bevel gear.

3. In a motor vehicle, the combination with a motor, front drive and steering wheels, Cardan shafts for the wheels, a differential gear between the Cardan shafts, and universal couplings between the differential gear and the Cardan shafts, of a change-speed gear with its axes longitudinally disposed, operative connections between the motor and the change-speed gear, and a single set of intermediate gears between the change-speed gear and the differential gear, the differential gear being directly behind the motor and engaged at the front end of the change-speed gear.

4. In a motor vehicle, the combination with a motor, front drive and steering wheels, Cardan shafts for the wheels, a differential gear between the Cardan shafts, and universal couplings between the differential gear and the Cardan shafts, of a change-speed gear with its axes longitudinally disposed and its first shaft in line with the motor shaft and operatively connected therewith, and a single set of intermediate gears between the second shaft of the change-speed gear and the differential gear, the differential gear being directly behind the motor and connected at the front end of the change-speed gear.

5. In a motor vehicle, the combination with a motor, front drive and steering wheels, Cardan shafts for the wheels, a differential gear between the Cardan shafts, and universal couplings between the differential gear and the Cardan shafts, of a change-speed gear with its axes longitudinally disposed, a driving connection between the motor and the first shaft of the change-speed gear, a bevel gear on the differential gear, and a bevel pinion on the second shaft of the change-speed gear and in mesh with said bevel gear, the differential gear being directly behind the motor and the bevel pinion on the second shaft of the change-speed gear being at the front end thereof.

This specification signed and witnessed this nineteenth day of December A. D., 1913.

MAURICE WALTER.

Signed in the presence of—
W. B. GREELEY,
WORTHINGTON CAMPBELL.